3,320,805
DATA COLLECTION SYSTEM
Rolf D. Kahle, Chicago, Ill., assignor to GPE Controls, Inc., Morton Grove, Ill., a corporation of Illinois
Filed Feb. 5, 1964, Ser. No. 342,761
10 Claims. (Cl. 73—313)

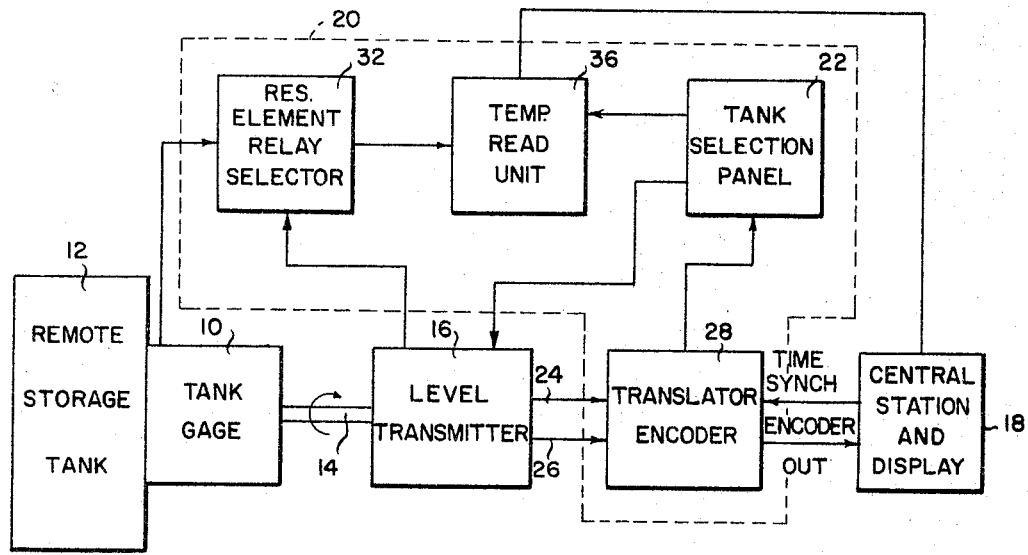
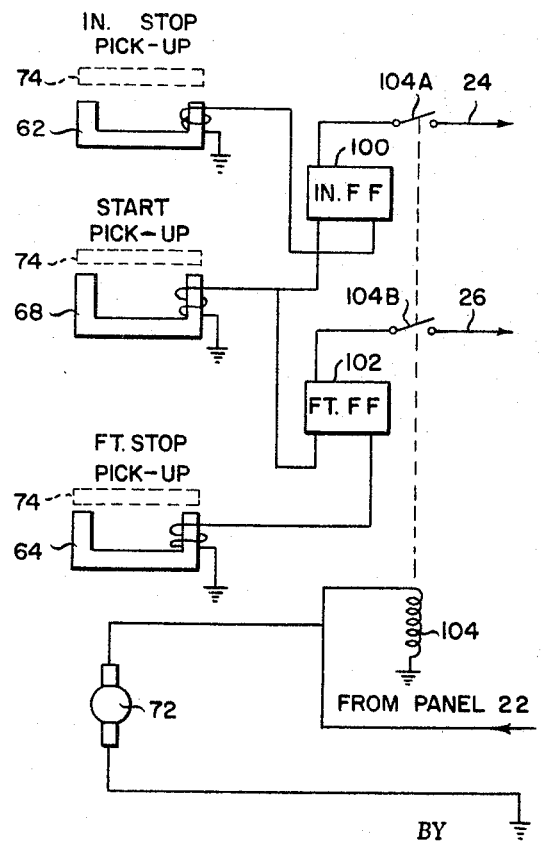

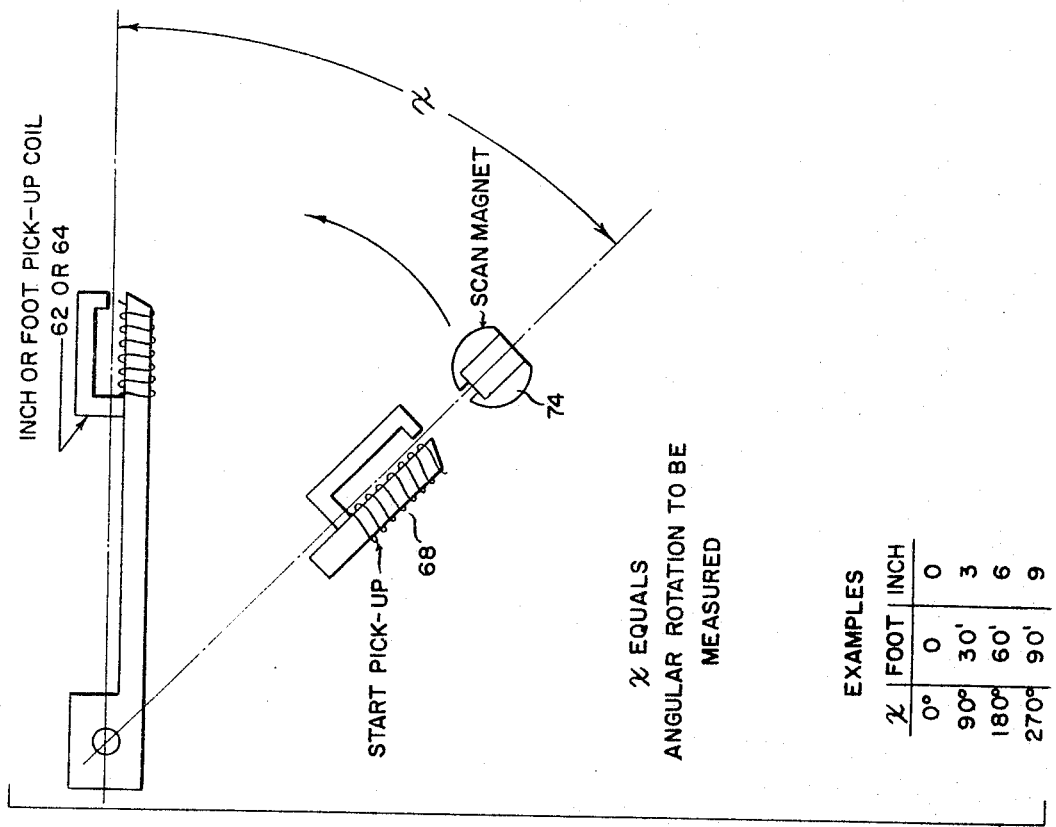
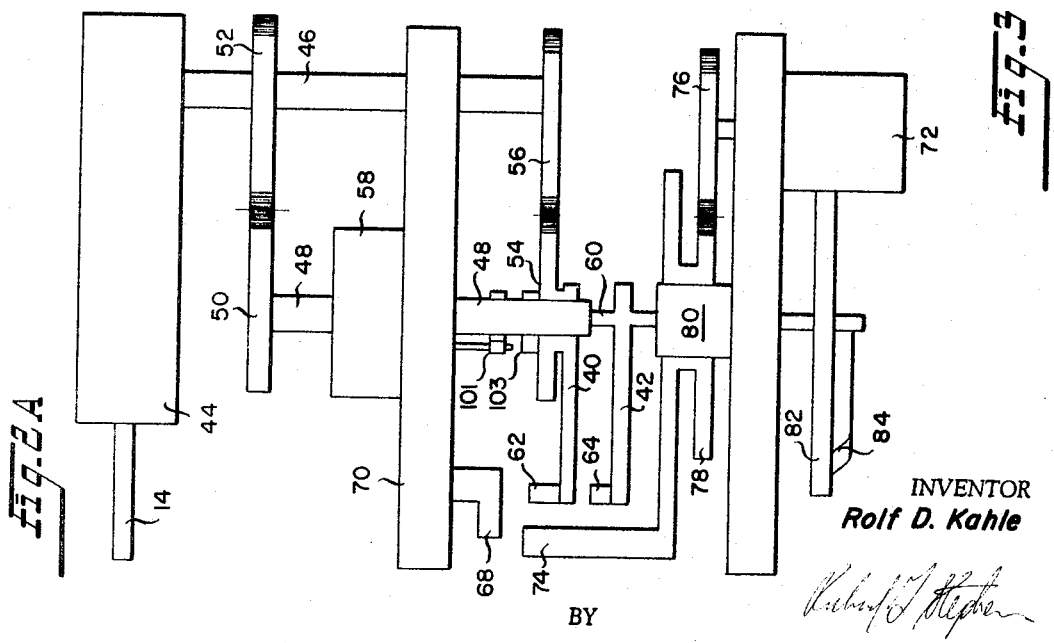

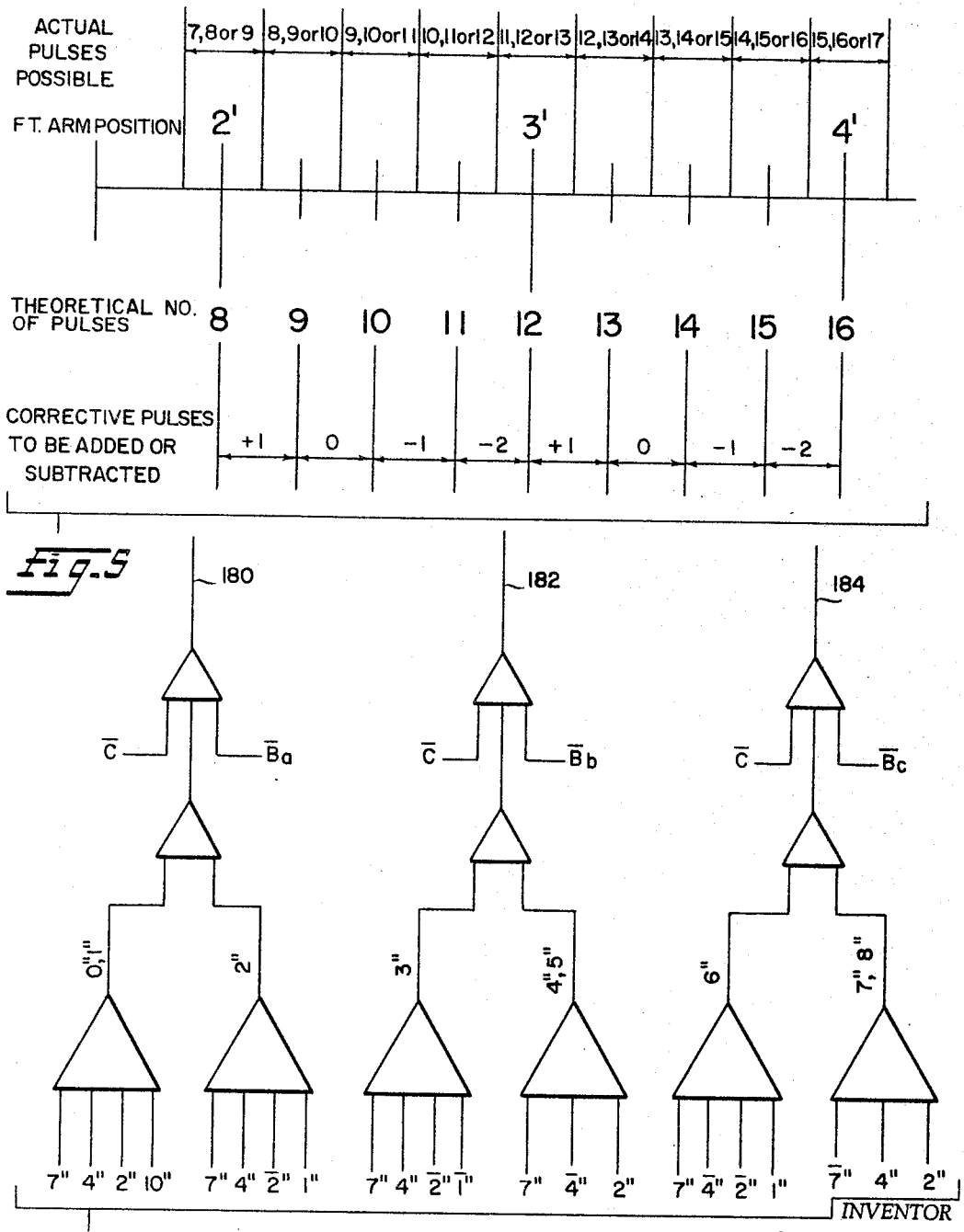

This invention relates to a data collection system and more particularly to an improved data collection system for transmitting encoded digital data from one or more selected field stations, to a central station.

In a variety of industrial control and data acquiring systems, it is often necessary to accurately measure selected system conditions and parameters such as, by way of example, the level and temperature of liquid stored in one or more remote tanks, and thereafter to encode and transmit digital data representative of such measurements to a central station at which the measurements are indicated, monitored, and/or recorded. In this manner, an operator can best determine to which ones of the remote storage tanks incoming fluid should be directed and which others of the remote storage tanks should be selected to have fluid removed therefrom, as necessary, in order that all of the number of remote storage tanks are economically operated at maximum efficiency.

In general, liquid level measuring devices of the prior art are divided into two basic classes, that is, the direct type and the indirect type. The direct type liquid level detectors include the well-known liquid manometers attached externally to the storage tank, the liquid level within the manometer corresponding to the liquid level within the tank. Additionally, the direct type detectors include those devices incorporating one or more float structures, the position of which determines the relationship between a pointer and an associated dial or, alternatively, imparts rotation to a shaft. The indirect type of liquid level detectors include a pressure sensitive detector fixedly positioned to the base of the tank, as well as capacitor type indicators wherein the tank itself is one plate of a capacitor and a centrally located shaft, insulated from the tank, functions as a second plate, the liquid between the tank and the shaft operating as a dielectric medium. Obviously, as the level of the liquid either increases or decreases, the total capacitance of the capacitor changes, and this change can be calibrated in terms of liquid level. It should be noted, however, that most indirect type liquid level indicators are directly affected by changes in the characteristics of the liquid such as density, specific gravity, composition, etc. so that normally, the indirect type are not as accurate as the direct type liquid level detectors.

In installations requiring high accuracy measurements, it is generally preferred that a direct type float operated tank gauge be employed to drive an output shaft to which a shaft encoder is attached. Generally, the shaft position encoding is accomplished by two printed circuit disks having the appropriate binary coding for feet and inches and exhibiting a resolution capability in the order of $1/16$ of an inch, with the feet encoded on one disk and inches on the other. The disks are interconnected through a transfer gear so that each revolution of the inch wheel advances the foot disk through one increment of travel. Further, the shaft is detented by a solenoid driven pawl during readout to prevent ambiguity which could occur if the shaft position were such that the transfer gear were engaged and the position of the foot disk were indeterminate. The output of the encoder may thereafter be converted to serial form by a commutator comprising a set of brushes, driven by a small stepping motor, wiping on a printed circuit disk. Finally, it usually is necessary that the entire indicator-encoder be contained in a casing filled with oil. However, it has been found that such indicator-encoders suffer from the inherent problems resulting from mechanical make and break contacts, as well as the necessary oil bath and, further are limited in the amount of flexibility that can be attained.

Accordingly, there is provided by the present invention an improved direct type liquid level detector which, while retaining all of the advantageous features provided by the prior art, eliminates the necessity of any mechanical contacts and, further, operates at rates significantly greater than those previously obtainable. Additionally, the data collection system includes a novel encoder to convert the measurement into digital form which thereafter can be directed to the central station in a selected code either parallelly or serially by word or bit. Briefly, the data collection system of the invention consists of a level transmitter positioned adjacent each remote storage tank and a translator-encoder unit installed at the field station which services a number of storage tanks. The translator-encoder unit, upon command from the central station, obtains tank level and tank temperature measurements of a selected remote storage tank, encodes these measurements into a predetermined binary code, and delivers this information to the central station. The transmitter portion of the invention converts the level of the liquid within the tank to a shaft position corresponding thereto. Directly coupled to the shaft is a first rotatable arm which represents the inch measurement, and, also coupled to the shaft through a gear reduction unit, is a second rotatable arm which represents the feet measurement of the liquid level within the tank. Each of the rotatable arms has a magnetic coil attached thereto, and a further reference coil is positioned in vertical spaced relationship to the planes traversed by the magnetic coils secured to the first and second rotatable arms, this reference coil corresponding to the zero level. Upon command, a magnet driven by a synchronous motor first intercepts the reference coil to initiate a pair of timing operations, one of which terminates when the magnet thereafter intercepts the coil mounted on the inch measurement arm, and the second of which terminates when the magnet intercepts the coil mounted on the foot measurement arm. These timing operations initiated in accordance with a reference time position and terminating in accordance with the liquid level, are then converted into digital information in a novel manner by the translator-encoder unit, hereinafter described in detail. Additionally, the level transmitter portion of the invention is also operable to select the proper ones of the multiple resistance elements employed in measuring temperature in order that accurate and proper temperature measurements are obtained automatically in accordance with the level of the liquid contained within the tank.

It is an object of the invention, therefore, to provide a data collection system.

Another object of the invention is to provide an improved data collection system for transmitting encoded digital data from one or more selected field stations to a central station.

Yet another object of the invention is to provide an improved data collection system including a direct type liquid level measuring device which eliminates the use of break and make mechanical contacts.

Still another object of the invention is to provide an improved data collection system including a liquid level transmitter and translator-encoder operable at speeds greater than heretofore possible.

A further object of the invention is to provide an improved data collection system including a direct type liquid level measuring device operable to produce a pair of pulse duration signals, the first of which is directly proportional to inches and the second of which is directly proportional to feet.

A related object of the invention is to provide an extremely flexible encoder for use in a data collection system.

Yet another object of the invention is to provide an improved data collection system including a liquid level transmitter having a reference magnetic coil and a pair of interconnected rotatable magnetic coils positional in accordance with the liquid level within a storage tank and, a rotatable magnet cooperating with all of the magnetic coils for generating a pair of time duration signals indicative of the liquid level in terms of feet and inches.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a block diagram of a preferred embodiment of the data collection system of the invention.

FIG. 2A is a mechanical schematic diagram of a preferred embodiment of the level transmitter shown in FIG. 1.

FIG. 2B is an electrical schematic diagram of a preferred embodiment of the level transmitter shown in FIG. 1.

FIG. 3 is a diagrammatical illustration useful in understanding the operation of a portion of the level transmitter shown in FIG. 1.

FIG. 5 is a diagrammatical illustration useful in understanding the operation of a portion of the translator-encoder shown in FIG. 1.

FIG. 6 is a schematic diagram of a portion of the translator-encoder shown in FIG. 4.

Figure 4:
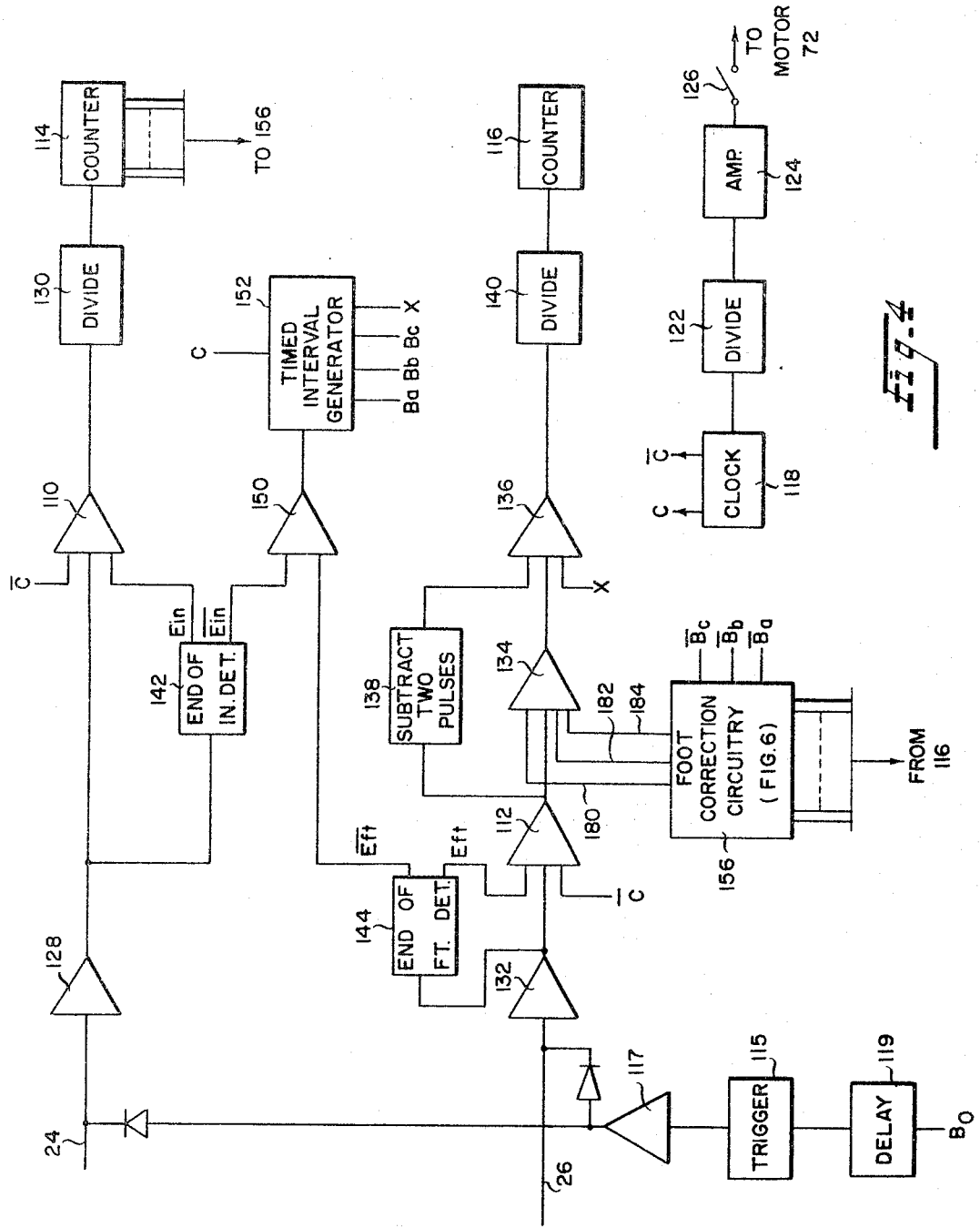
FIG. 4 is a detailed block diagram of a preferred embodiment of the translator-encoder shown in FIG. 1.

Although the apparatus of the present invention exhibits general utility, it is particularly adaptable for use in systems such as that disclosed in co-pending application Ser. No. 100,920, now abandoned, filed on Apr. 5, 1961, on behalf of Bernard T. Wilson et al. and assigned to the assignee of this invention. As there described, a telemetry data logging system is provided with a central station and one or more addressable field stations interconnected by a single wire loop. Each field station has provisions for measuring and monitoring selected parameters and for controlling several of the instruments and control devices installed thereat. Upon command from the central station, the addressed field station provides data in digital form, in a 2 out of 5 check code in one specific embodiment by way of example, representative of various measurements as well as the position of several controls.

As indicated briefly above, the data collection system of the present invention includes a level transmitter which provides pulse duration signals to a level translator-encoder, as well as providing an indication as to which particular one of multiple resistance elements should be employed for a temperature measurement in accordance with the determined level reading. Further, it should be understood that it is necessary that the embodiment of this invention, when employed with the above-referenced data logging system, provide the output digital data representative of a measurement also in the 2 out of 5 check code. Alternatively, in order that the data collection system now being described also have utility with other and different data logging systems, or liquid level monitoring and display apparatuses, it is necessary that the level translator-encoder be operable to provide the digital data in any of the well-known digital codes and, although the data collection device will be primarily described for use with the referenced co-pending application, further embodiments will also be briefly indicated and described for a more complete understanding of the principles of this invention.

Referring now to the drawings, FIG. 1 illustrates a block diagram of a preferred embodiment of the data collection system of the invention. As there shown, a float operated tank gauge 10 is operatively coupled to a remote storage tank 12. The liquid level within tank 12 is effective in conjunction with gauge 10 to rotatably position a shaft 14 coupled to a level transmitter 16, it being understood that normally a plurality of such transmitters are controlled by each field station. Upon command from a central station 18 to a selected field station 20, a tank selection panel unit 22 initiates a readout of the liquid level in a selected tank 12. A synchronous motor within level transmitter 16 is energized by panel 22 and after a time delay interval determined by the time necessary for the motor to attain true synchronous speed, the position of shaft 14 is converted into a pair of electrical pulse duration signals, the duration of one of the pulses corresponding to the foot level of the liquid, and the duration of the other pulse corresponding to the inch level of the liquid within tank 12, all without the use of any mechanical make or break contacts. These pulse duration signals are then conveyed along parallel lines 24 and 26 to a level translator-encoder 28 located at field station 20. Each of these pulse signals are effective in a novel manner, to be hereinafter more particularly described in detail, to apply a sequence of clock pulses to a counter unit, the count in each of the counter units being indicative of the feet and inch measurements. Additionally, level translator-encoder 28 includes a novel completion of message indicator in order that only a single one of the pulse duration signals, corresponding either to the inch or foot measurement, be effective to apply the clock pulses to the counter. Further, the possibility of any ambiguity arising during those measurements at which the inch indication approaches the next foot indication is eliminated in the following manner. Novel logic circuitry is included to first subtract a predetermined number of pulses from the foot measurement and thereafter at the completion of a message interval to add a selected number of pulses to the foot measurement in accordance with the inch measurement previously obtained. In this fashion, the foot correction necessary to resolve any possible ambiguity is based on using the accurate inch information to correct the foot information which obviously cannot be accurate to fractions of inches as the inch measurement necessarily is.

Next, in accordance with the requirement of the overall system wherein the data collection system is employed, the information stored in the counters is delivered to central station 18 along one or more wires 30 or, alternatively, through the use of conventional telemetry systems. When employed in the data logging system referred to above, a pair of timing generators are used to serially read out the information stored in the counter units. The first of these time generators, known as the K time generator, provides equal time intervals during which the 10's of feet, the feet, the 10's of inches and the $\frac{1}{20}$ of inches are successively interrogated. The second of the time generators, known as the B time generator, and controlled by the K time generator, subdivides each K time interval into a number of equal time intervals during which each bit of the K data blocks is sequentially interrogated and conveyed to central station 18. For a more particular description of the conversion of the counter output into serial binary 2 out of 5 data check code, reference should be had to co-pending application Ser. No. 306,551, filed Sept. 4, 1963, on behalf of John Scarbrough et al. and assigned to the assignee of this invention. As there disclosed, an encoding apparatus is provided in which a sequence of pulses at a random rate, provided by a flow meter installed at a remote location controlled by a field station, are applied to a number of serially connected counter stages which operate in the 7421 binary code, the information thereafter being applied to the central station in the 74210 2 out of 5 binary check code by means of novel circuitry which may also be included in transmitter-encoder 28 of this invention.

Additionally, as shown in FIG. 1, level transmitter 16 is also coupled to a resistance element relay selector unit 32 through a line 34, the selected resistance element then being relay connected into a bridge circuit which forms a part of a temperature read unit 36 of field station 20, the operation of which is more specifically described in co-pending application Ser. No. 161,112, filed Dec. 21, 1961, now Patent No. 3,218,628, on behalf of Daniel A. Weinstein and assigned to the assignee of the present invention. The temperature measurement determined by temperature read unit 36 is also conveyed to central station 18 and the liquid level and/or temperature measurements are thereat indicated, monitored and/or displayed.

Referring now to FIG. 2A, there is illustrated a mechanical schematic diagram of level transmitter 16. As there shown, transmitter 16 includes an inch pickup arm 40 and a foot pickup arm 42. Float gauge output shaft 14 is rotatably engaged within a base assembly 44 terminating in a bevel gear (not shown) to convert the horizontal rotary motion imparted by the float gauge to vertical rotary motion of output shaft 46. The rotary motion of shaft 46 is directly coupled through a 1 to 1 ratio to a hollow shaft 48, through a double set of spur gears 50–52 and 54–56. By means of a gear reduction unit 58, a concentric shaft 60 positioned within shaft 48 is coupled thereto in such a manner that one revolution of shaft 48, the inch shaft, provides a known increment of rotation to shaft 60, the foot shaft. In a specific example to be described in detail, unit 58 provides a 120 to 1 gear reduction in order that one revolution of float gauge shaft 14 rotates inch pickup arm 48 through one revolution and the foot pickup arm $\frac{1}{120}$ of a complete revolution.

Each of the pickup arms has mounted thereon a magnetic pickup coil, generally indicated as 62 and 64, and in addition to the foot and inch pickup coils, there is a start pickup coil 68 rigidly secured to housing member 70. During a level measurement operation, a synchronous scan motor 72 drives a magnet, generally indicated as 74, through a pair of gears 76 and 78, gear 78 being rotatable about shaft 60 by means of bearing member 80. As magnet 74 passes, adjacent to each pickup coil 62, 64 and 68, a voltage pulse is induced in the respective coils. These pulses are employed to activate a pair of information lines, one representative of feet and one representative of inches. At the time the scan magnet passes start pickup coil 68, both information lines are switched from zero or ground potential to a negative potential. Thereafter, when the scan magnet passes foot pickup coil 64, the foot information line returns to ground potential. In similar fashion, when the scan magnet passes inch pickup coil 62, the inch information line also returns to ground potential. This results in that a pulse duration signal is produced on each of the two information lines, one pulse duration signal being directly proportional to inches and the other pulse duration signal being directly proportional to feet.

Also, shown in FIG. 2A is a multiple resistance element select code disk 82 secured at the bottom level of the transmitter, and, for convenience, is illustrated as being supported by synchronous motor 72. A multiple resistance scan arm 84 is secured to and rotated by foot shaft 60, and, as shaft 60 rotates, different segments on code disk 82 are selected by scan arm 84. These elements are wired into relay selector 32 (see FIG. 1) and are employed for switching in the correct resistance element, or bulb, based on the tank level. In those instances when scan arm 84 contacts two segments, the resulting ambiguity is removed by the interlocking of the external relays. Scan arm 84 is adjusted to contact the next higher segment only when the actual level is slightly lower than a level corresponding to the highest segment. This feature assures that each element selected is always totally submerged.

It should now be understood that level transmitter 16 receives a horizontal shaft rotary input from the tank float gauge and converts this to a vertical shaft rotation. This vertical shaft rotation is then coupled to inch shaft 48 of the level transmitter. The inch shaft of the level transmitter controls both the input to a 120 to 1 gear reducer unit as well as the rotation of the inch arm. The output of the 120 to 1 gear reducer unit controls the position of the foot arm which rotates about the same center as the inch arm, with the foot arm shaft being located internal of the inch arm shaft. Mounted on a rigid housing member is a start pickup coil and the relative position of each of the pickup arms is defined by the number of degrees rotation between the center line of the gap of the start pickup coil and the center line of the gap of the respective inch or foot pickup coil.

Referring now to FIG. 3, this angular relationship is illustrated in simplified form. As there shown, scan magnet 74 is positioned along the center line of air gap of start pickup coil 68, and, from this position is effective to initiate a pair of pulse duration signals, one of which is directly proportional to the inch measurement and the second of which is directly proportional to the foot measurement. As hereinbefore stated, scan magnet 74 rotates at synchronous speed during a level measurement operation, and, therefore, the time interval required by the scan magnet to traverse the angle defined by the center line of start pickup coil 88 and the center line of the inch or foot pickup coil 62 or 64 is employed to generate the desired pulse duration signals. As further shown in FIG. 3, the angle to be traversed is indicated as $x$, and four illustrative examples are tabulated in the case of the specific example wherein gear reduction unit 58 provides a ratio of 120 to 1 between the inch and foot shaft rotations. When the center line of the inch and foot pickup coils correspond exactly to the center line of the start pickup coil, that is, when angle $x$ equals 0°, each of the time intervals correspond exactly to 0 providing a measurement of 0 feet and 0 inches. Continuing, when angle $x$ equals 90°, that is, the center line of both the inch and foot pickup gears are displaced 90° or ¼ revolution from reference coil 68, the time duration signal on the inch information line corresponds to 3″ and the time duration signal on the foot information line corresponds to 30′. This latter measurement can best be understood when it is considered that it takes 120 revolutions of the inch arm, that is, 120 feet, to cause the foot arm to rotate through one revolution. The further examples shown in FIG. 3 are derived in exactly the same fashion. It should be noted, and this is an extremely important feature of the present invention, that the level transmitter requires no mechanical contacts to be made in order to convert the tank float shaft rotation into electrical signals. Rather, a pair of mechanical transmitters are employed to provide pulse duration signals corresponding to the position of the inch and foot shafts without the necessity of any moving mechanical contacts which, obviously, is effective to increase the overall reliability of the system.

Referring now to FIG. 2B, there is illustrated a simplified electrical schematic diagram of electrical transmitter 16. As there shown, transmitter 16 includes motor 72, start pickup coil 68, inch and foot pickup coils 62 and 64, and scan magnet 74, which is illustrated in phantom adjacent each of the pickup coils. Also included in transmitter 16 are a pair of flip-flops 100 and 102 and a relay 104, including a pair of normally open contacts 104A and 104B. Upon energization of synchronous motor 72 by level translator-encoder 28, relay 104 is also energized, either by the A.C. signal applied to motor 72 or, alternatively, if relay 104 is D.C. operated by means of an intermediate A.C. to D.C. converter, thereby closing contacts 104A and 104B connecting the set output of inch flip-flop 100 to information line 24 and the set output of flip-flop 102 to information line 26, respectively. Relay 104 functions merely to isolate transmitter 16 from translator-encoder 28 during those time periods when it is not desired to obtain data from a particular transmitter 16. In those installations where only a single remote storage tank is to be monitored, relay 104 can be eliminated or, alternatively, in those installations whereat a number of remote storage tanks are to be measured, other and different isolation circuitry may be included in translator-encoder 28. Next, the rotation of scan magnet 74 past start pickup coil 68 is effective to set both inch flip-flop 100 and foot flip-flop 102 to the true condition. Thereafter, continued rotation of scan magnet 74 results in that the magnet next passes the inch pickup coil and the foot pickup coil or vice versa. These pickup coils each generate a pulse which operates to reset the respective flip-flop, to the false condition. It should be understood that the inch pulse, generated by the pickup coil, is transferred through two coils, the first coil, 101, being rigidly supported by housing member 70 and the second coil, 103, being rotatable in accordance with the position of inch arm 40. Magnetic coupling is obtained between coils 101 and 103 through the use of a cylindrical magnetic core concentric about shaft 48, or, alternatively, fabricating this effected portion of shaft 48 itself of magnetic material, in order that coils 101 and 103 function as a transformer. It again should be emphasized, since this is an important feature of the invention, that it has been shown that the data collection system operates to convert a shaft position into electrical signal indicative of the shaft position without the use of any mechanical contacts or slip rings. In this manner, the inch pickup coil is rotatable through the necessary number of revolutions without wrapping the inch output lead about shaft 48. The resetting of flip-flops 100 and 102 terminates the pulse duration signals applied to lines 24 and 26, and, as hereinafter described, detection of the completion of message within translator-encoder 28 is effective to remove the power applied to level transmitter 16. Further, an emitter-follower circuit may be coupled to the set output of the inch and foot flip-flops in order to provide low source impedance to the drive information lines 24 and 26. This, generally, is important from the standpoint of preserving the sharpness of the leading edge of the pulse duration signals as a result of the distributed capacitance of the information lines. Additionally, a diode is normally provided to present a low transmitter output impedance from the standpoint of the information line distributed capacitance discharging after the flip-flops have been reset, in order to preserve the sharpness of the trailing edge of the pulse duration signals.

It also should be noted, and this is another important feature of the invention, that only two calibration operations are required for the level transmitter. The first is a zero calibration adjustment which is normally performed at the time the transmitter is fabricated. This is done by aligning the inch, foot, and start pickup coils so that their gap center lines are all on the same axial center lines. The foot pickup arm is normally first aligned with the start pickup coil and the inch arm is thereafter adjusted, if necessary, by loosening its shaft clamp and rotating the arm. The second calibration is performed in the field and is required to match the transmitter to the specific float gauge. This is performed in the following manner. The reading on the float gauge is first noted and starting with the transmitter at zero position the input shaft is rotated as many revolutions as there are feet displayed on the float gauge, and the inch arm setting is approximated remembering that 12 inches equals one inch arm revolution. Next, the transmitter is interrogated from the translator-encoder unit, and, through successive corrections, the readout on the digital display is matched with the reading on the float gauge. At this time, the coupling between the level transmitter and the float gauge is secured. Thus, all complex and time consuming installation calibration procedures are eliminated and, further, no recalibration is periodically necessary thereafter.

FIG. 4 illustrates a block diagram of a translator-encoder useful in a preferred embodiment of the invention. As there shown, translator 28 receives two separate pulse duration signals from each transmitter 16 along information lines 24 and 26, one for inches and one for feet. These pulse duration signals are converted into two pulse chains by NOR circuits 110 and 112 which are counted in decade counters 114 and 116 respectively. The pulses are generated from a free-running clock 118 which also determines the frequency applied to transmitter motor 72. The outputs of the decade counters represents the level data in parallel binary coded decimal form and this information may then be gated out serially by using the K and B time base generators as disclosed in co-pending application Ser. No. 306,551 hereinabove referred to. Prior to a particular interrogation time, a signal $B_0$, supplied by the central station, is true and causes the output of a trigger 115 and an amplifier 117 to be slightly positive, thus holding the information lines positive. After interrogation is commenced, $B_0$ goes false and approximately two seconds later the amplifier output is switches off, which permits the pulse duration signals to switch their input amplifiers. This two second delay time insures that synchronous motor 72 in transmitter 16 attains true synchronous speed, and may be introduced through a 2 second delay line 119 connected in series with the $B_0$ input line in translator-encoder 28 as shown or, alternatively, the delay may be automatically introduced in the central station itself.

As a specific example, clock 118 runs at 1920 c.p.s. and is divided by 32 in divider unit 122 to provide a 60-c.p.s. input signal to power amplifier 124. The output of this amplifier is applied through a tank selection switch 126 to the transmitter unit associated with the selected remote storage tank. In order to compensate for line voltage drops determined by the distance between translator 28 and each of transmitters 16, the output of power amplifier 124 is normally transformer coupled to the transmitter unit, a multi-tapped secondary being employed in the output of amplifier 124. It should also be obvious that other and different frequencies can and have been chosen for clock 118. The specific choice of 1920 c.p.s., however, will be utilized in each of the numerical examples to follow unless otherwise specified.

The inch signal provided on line 24 is first passed through a spike protection network, if desired, and thence through an inverter amplifier 128 resulting in that the inch information signal is false during the pulse duration time by virtue of having passed through inverter amplifier 128, and this inch signal remains false until the end of the pulse duration time. The output of amplifier 128 is applied to one input of NOR circuit 110, and an end of inch signal is applied to a second input of NOR circuit 110. This end of inch signal is also false until the end of the pulse duration signal. Additionally, pulses from clock 118 are applied to a third input of NOR circuit 110 and therefore, during the time intervals that the clock signals are false, the output of NOR circuit 110 is true and clock pulses are present on the output of NOR circuit 110, which are first divided by 2 in frequency divider 130 and thence counted in counter 114. Since in the specific numerical example the clock runs at 1920 c.p.s. and scan motor 72 makes one revolution in ¼ second, the total possible pulses generated by a maximum inch pulse duration signal is 480, which divided by 2 equals 240, which corresponds to the number of $\frac{1}{20}$ inch in a foot. Pulses are generated by the foot pulse duration signal appearing on line 26 in essentially a similar manner, except for several additional features. Again, the foot pulse duration signal is applied through an inverter amplifier 132 to a first input of NOR circuit 112, that is, a second input of NOR circuit 112 is coupled to the end of foot signal and the 3rd input is coupled to clock 118. Since the output of amplifier 132 is false during the foot pulse duration signal, as is the end of foot signal, clock pulses are present at the output of NOR circuit 112. The output of NOR circuit 112 is coupled to a first input of another NOR circuit 134. However, at this time, all the other inputs to NOR circuit 134 are false while the clock pulses provided by NOR circuit 112 are true. Thus, the output of NOR circuit 134 is false which is coupled to one input of yet another NOR circuit 136. However, at this time, the output of subtract 2 pulses unit 138 is true, thereby effectively preventing the output of NOR circuit 136 from being true to activate counter 116. It should be noted, however, that the output of NOR circuit 112 is also applied to unit 138. Unit 138 consists essentially of a pair of flip-flops, the setting of the first by a first input pulse enables the setting of the second by a second input pulse, such that the second input pulse applied to unit 138 results in the output thereof being switched to false. Thus, the third and subsequent clock pulses provided from NOR circuit 112 pass through NOR circuit 134 and are now effective to cause the output of NOR circuit 136 to be true. The output pulses from NOR circuit 136 are divided by 4 in frequency divider 140 and are counted by counter 116.

A pair of completion of message detectors 142 and 144 are included to insure that only a single inch and a single foot pulse duration signal is counted during each interrogation operation, even though transmitter motor 72 may be effective to apply a number of pulse duration signals to lines 24 and 26. Remembering now that each of inverter amplifiers 128 and 132 are effective to render the pulse duration signals applied to NOR circuits 110 and 112 false during the pulse duration time intervals, these false signals are separately applied to the end of inch detector 142 and end of foot detector 144. Each of these detectors includes an inverter amplifier connected to a flip-flop which is set when the output of the inverter becomes false. Therefore, during the time interval encompassed by each of the pulse duration signals, the output of the inverters are true since the input applied thereto is false. However, at the end of both the inch information signal and the foot information signal, the output of the inverters each becomes false, setting the end of inch detector and end of foot detector to the true condition. Note should again be made of the fact that the end of inch signal is applied to the second input of NOR circuit 110 which, upon completion of the information message, becomes true. Additionally, the inch information signal itself, applied to the first input of NOR circuit 110, now is also true. Therefore, the output of NOR circuit 110 is subsequently false resulting in no clock pulses being available to be counted by counter 114. This will be clear when it is considered that if the clock pulse applied to the third input of NOR circuit 110 is true, the output of the NOR circuit is false, and, in accordance with the conventional logic rules, should the clock signal itself be false, the output of NOR circuit 110 also remains false. It can also be seen that NOR circuit 112 operates in exactly the same manner, the end of foot signal becoming true being effective to disable NOR circuit 112.

Additionally, upon detection of the completion of message, a further NOR circuit 150 has its input coupled to the reset outputs of end of inch detector 142 and end of foot detector 144. During the pulse information time interval, each of these signals is true, resulting in the output of NOR circuit 150 being false. However, at the end of the information period, each of these inputs becomes false resulting in the output of NOR circuit 150 becoming true. The output of NOR circuit 150 is applied to the input of a timed interval generator 152, which consists of a sequence of 4 flip-flops wherein the second flip-flop cannot be set until the first has been set, the third cannot be set until the second has been set and the fourth cannot be set until the third has been set. Upon the output of NOR circuit 150 becoming true, the first clock pulse is effective to set the first flip-flop to true. This enables the second flip-flop to be set to true by the second clock pulse and continuing in like manner, the fourth flip-flop is set to the true condition by the fourth clock pulse. Note that the output of the fourth flip-flop becoming true is effective to close NOR gate 136. By logically combining, in a manner to be described, the outputs of the first 3 flip-flops in generator 152 with the information stored in counter 116 in a foot correction logic circuit 156 shown in FIG. 6, it is possible to add 1, 2, or 3 pulses to the foot measurement after the termination of the foot pulse information signal in order to remove any possible ambiguity when the inch measurement approaches the next whole foot number, as well as to insure that the foot information is maintained as correct as the inch information.

For the reason that it is simpler to subtract pulses from a pulse chain prior to the chain being applied to a counter, rather than attempting to subtract pulses from the count standing in the counter, subtract 2 pulses unit 138 has been serially inserted in the foot information line to always subtract 2 pulses from the foot information pulse chain as hereinabove described. Thereafter, at the end of the foot pulse train either 0, 1, 2, or 3 pulses are added to the foot pulse train to insure proper transfer from one foot to the next as the inch arm turns from $11^{19}/_{20}$ of an inch to $00^{0}/_{20}$ inch. Foot correction logic circuitry 156 is employed to provide this foot correction and is based on using the accurate inch information to correct the foot information which obviously could not be correct to within $\frac{1}{20}$ of an inch. Referring now to FIG. 5, note that normally 4 pulses are generated for each position of the foot arm corresponding to one foot. However, due to an accumulation of all possible errors, such as backlash between the foot and inch arms, the clock pulse not starting precisely at the start of the pulse duration signal, etc., the actual pulse generated over any ¼ of a foot segment can be the nominal value plus or minus one. Therefore, by merely determining at which of the ¼ foot segments the foot arm is positioned, based on information provided by the inch arm, the circuitry can properly correct the number of foot pulses generated. Considering the ¼ foot segments one at a time, it is noted that between a 0 and 2 inch segment, the number of possible pulses shown in a specific example can be 7, 8, 9 or 10. It is known that the reading should be 2 feet, therefore, by adding one pulse to a foot pulse chain, the possible number of pulses is 8, 9, 10 or 11. Any of these numbers divided by 4 are equal to 2 feet since the output of frequency divider 140 always yields the lowest whole number. In the 3-inch to 5-inch segments it is not necessary to add any pulses to the foot pulse chain since the possible number of 8, 9, 10 or 11 pulses always produces a reading of 2 feet. Continuing in the 6 to 8 inch segment, the number of possible pulses are 9, 10, 11 or 12. Therefore, one must subtract one pulse to insure a 2-foot reading. In the final 9 to 11 inch segment the possible number of pulses are 10, 11, 12 or 13. Therefore, it is necessary to subtract 2 pulses to insure that a 2-foot reading is obtained. As stated before, since it is difficult to subtract pulses from a counter after they are all counted, 2 pulses are subtracted from the foot pulse chain at the start. Therefore, the foot correction logic circuitry is automatically effective to add 3 pulses to the 0 to 2 inch segments, 2 pulses to the 3 to 5 inch segments, 1 pulse to the 6 to 8 inch segment and 0 pulse to the 9 to 11 inch segment, in order to insure that the proper 2-foot reading is always obtained. Foot corection logic circuitry 156 decodes the inch counter to determine which ¼ segment the reading is in and in accordance with the timed interval generator 152 provides the proper number of pulses to the foot pulse chain.

Referring now again to FIG. 4, counter 116 stores the foot information in a pair of decade counters, the first of which stores the 10's of feet and the second of which stores the units of feet. When the data collection system of this invention is to be employed as one unit of the data logging system described in co-pending application Ser. No. 100,920, now abandoned, it is preferable that the data stored in the counters be in the 7421 binary code rather than the 8421 binary code. This is readily accomplished as shown in co-pending application Ser. No. 161,112, now Patent No. 3,218,628, by the addition of a pair of NOR circuits in each counter stage. The first of these NOR circuits has its input coupled to the $\bar{1}$, $\bar{2}$ and $\bar{4}$ counter stages. This NOR circuit is then operable, upon receipt of the seventh pulse which would normally tend to set the 7421 stages in the binary sequence 0111, to reset each of the 4, 2 and 1 stages to 0, the resetting of the 4-stage providing a carry signal to the 7 stage, so that the decimal number 7 is stored in a form 1000. The second of the NOR circuits has its input coupled to the $\bar{1}$, $\bar{2}$, and $\bar{7}$ stages so that upon receipt of the tenth pulse, this NOR circuit is effective to reset all of the stages to 0. A more complete description of such counter stages is, of course, included in co-pending application Ser. No. 161,122.

Inch counter 114 differs slightly from the foot counter 116 since a 10 inch single stage is additionally employed with the units of inches counter, and a single $^{19}\!/_{20}$ inch counter stage is employed with the 20th of inches decade counter stage. Again, the units and 20th of inches decade counter stages count in the 7421 binary code. However, upon receipt of the tenth pulse, which operates to reset the units decade counter stages to zero, a carry signal is provided to the 10 inch single counter stage. A further NOR circuit is included in the 10 inch single counter stage having its inputs coupled to $\overline{10}$ and $\bar{2}$ in order that the receipt of the twelfth pulse reset the total inch count to zero. Additionally, the single $^{19}\!/_{20}$ inch counter stages operates in the same manner as the single 10 inch stage, that is, the resetting of the 20th of inches counter stages provides a carry signal to the $^{19}\!/_{20}$ inch stage. However, no separate NOR circuit is included in the $^{19}\!/_{20}$ inch counter stage since the twentieth pulse applied to the 20th of inches decade counter stage is effective, of and by itself, to provide a further carry signal to reset the $^{19}\!/_{20}$ inch counter stage to zero.

Although it should be understood that the various flip-flops employed throughout translator-encoder 28 must be reset prior to the commencement of a measurement operation, this reset function, controlled by the central station has been omitted from the drawings for reasons of clarity.

What has been described is an improved data collection system wherein the position of a rotatable shaft is converted into electrical signals proportionate thereto without the use of any mechanical make or break or sliding contacts. Further, novel logical circuits are disclosed for converting these proportionate electrical signals into a pulse chain, the number of pulses thereafter being storable in an electronic counter, the stored count being indicative of the shaft position, and in a preferred embodiment specifically disclosed, the stored count accurately represents the level of a liquid in a remote storage tank in terms of feet and inches.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

What is claimed is:
1. A data collection system comprising,
 (a) a direct type liquid level float gage for positioning an output shaft in accordance with the level of a liquid;
 (b) a transmitter coupled to said shaft for electromagnetically generating a pair of electrical time duration signals representative of the cumulative angular position of said shaft, one of said signals being indicative of said level in feet and the other of said signals being indicative of the remainder of said level in inches;
 (c) translator means coupled to said transmitter for converting said pair of electrical time duration signals into first and second pulse sequences wherein the number of pulses in each of said sequences is indicative of the time duration of said signals and thereafter counting and storing said pulse sequences in electronic counters;
 (d) said translator including means to subtract a predetermined number of pulses from the pulse sequence derived from the time duration signal indicative of the liquid level in feet and further means operable upon the termination of both of said pair of time duration signals for adding to the pulse sequence derived from the time duration signal indicative of the liquid level in feet a number of pulses selected in accordance with the number of pulses in the pulse sequence derived from the time duration signal indicative of the remainder of the liquid level in inches.

2. The system of claim 1 wherein said transmitter further includes means to select one of a plurality of temperature indicating resistances in accordance with said liquid level determination.

3. The method of translating an analog quantity commensurate with the sum of the distances of a first movable element and a second movable element from reference positions to provide an output digital quantity commensurate with said analog quantity, said digital quantity comprising a most significant portion and a least significant portion, comprising the steps of:
 (a) measuring said first and second distances to provide respective first and second pulse counts, said first pulse count comprising said least significant portion of said output digital quantity;
 (b) adding to or subtracting from said second pulse count a first predetermined value depending upon the range within which said first pulse count falls, thereby to provide an altered pulse count; and
 (c) dividing said altered pulse count by a second predetermined value and rounding off the quotient to provide the most significant portion of said output digital quantity.

4. The method of claim 3 wherein the step of measuring said distances comprises the step of determining the time required for a scanning element moving at a known velocity to traverse said distances.

5. The method of claim 4 wherein the step of measuring said distances comprises the step of counting clock pulses during said times.

6. Apparatus for translating an analog quantity commensurate with the sum of the distances of a first movable element and a second movable element from reference positions to provide an output digital quantity commensurate with said analog quantity, said digital quantity comprising a most significant portion and a least significant portion comprising, in combination:
 (a) means for measuring said first and second distances to provide respective first and second digital values, said first digital value comprising said least significant portion of said output digital quantity;

(b) means for adding to or subtracting from said second digital value a predetermined value depending upon the range within which said first digital value falls, thereby to provide an altered digital value; and (c) means for dividing said altered digital value by a predetermined value and rounding off the quotient to provide the most significant portion of said output digital quantity.

7. Apparatus according to claim 6 in which said means for measuring comprises means for moving a scanning element at a predetermined velocity through each of said distances; a clock pulse generator for generating clock pulses as said scanning element is moved through said distances, and means for counting pulses generated by said clock pulse generator as said scanning element is moved through said distances.

8. Apparatus according to claim 7 in which said means for moving said scanning element comprises a motor, and means controlled by said clock pulse generator for controlling the speed of said motor.

9. Apparatus according to claim 8 wherein said first and second elements and said scanning element are so constructed and arranged that movement of said scanning element in proximity to said first and second elements provides electrical signals indicating said first and second distances, respectively.

10. Apparatus according to claim 9 wherein said first and second elements comprise electrically conducting coils and said scanning element comprises a magnet.

References Cited by the Examiner

UNITED STATES PATENTS

| | | |
|---|---|---|
| 2,403,889 | 6/1946 | Di Toro. |
| 2,625,043 | 1/1953 | Tapp et al. _____ 73—313 X |
| 2,677,276 | 5/1954 | Schmidt _____ 73—292 |
| 2,730,698 | 1/1956 | Daniels et al. _____ 340—206 |
| 2,869,113 | 1/1959 | Reymonenq _____ 73—313 X |
| 3,184,975 | 5/1965 | Lindemann _____ 340—206 X |

LOUIS R. PRINCE, *Primary Examiner.*

S. C. SWISHER, *Assistant Examiner.*